United States Patent
Feng

(10) Patent No.: US 8,283,903 B2
(45) Date of Patent: Oct. 9, 2012

(54) INTEGRATED VOLTAGE AND VAR OPTIMIZATION PROCESS FOR A DISTRIBUTION SYSTEM

(75) Inventor: Xiaoming Feng, Cary, NC (US)

(73) Assignee: ABB Research Ltd., Zurich (CH)

(*) Notice: Subject to any disclaimer, the term of this patent is extended or adjusted under 35 U.S.C. 154(b) by 450 days.

(21) Appl. No.: 12/699,639

(22) Filed: Feb. 3, 2010

(65) Prior Publication Data
US 2010/0198422 A1     Aug. 5, 2010

Related U.S. Application Data

(60) Provisional application No. 61/150,185, filed on Feb. 5, 2009.

(51) Int. Cl.
G05F 1/14 (2006.01)
G05F 1/70 (2006.01)
(52) U.S. Cl. .......... 323/255; 323/209; 323/340
(58) Field of Classification Search .......... 323/209–211, 323/255–258, 283, 340, 351
See application file for complete search history.

(56) References Cited

U.S. PATENT DOCUMENTS

| | | | |
|---|---|---|---|
| 4,916,377 A | | 4/1990 | Terada |
| 5,422,561 A | | 6/1995 | Williams et al. |
| 5,541,498 A | * | 7/1996 | Beckwith ............... 323/211 |
| 6,335,613 B1 | * | 1/2002 | Sen et al. ............... 323/216 |
| 8,195,338 B2 | * | 6/2012 | Feng et al. ............. 700/286 |
| 2010/0114400 A1 | * | 5/2010 | Feng et al. ............. 700/298 |
| 2011/0169461 A1 | * | 7/2011 | Deaver, Sr. ............ 323/209 |

FOREIGN PATENT DOCUMENTS

WO    2010091076    8/2010

OTHER PUBLICATIONS

J.J.Grainger and S.Civaniar, "Volt/Var Control on Distribution Systems with Lateral Branches Using Shunt Capacitors and Voltage Regulators—Part 1: The Overall Problem,"IEEE Trans. Power Apparatus and Systems, vol. PAS-104, No. 11, pp. 3278-3283, Nov. 1985.

(Continued)

Primary Examiner — Jessica Han
(74) Attorney, Agent, or Firm — Michael C. Prewitt; Melissa J. Szczepanik

(57) ABSTRACT

The method determines the optimal settings for the controllable taps $u_t$ of voltage regulating transformers and the capacitor bank switches $u_c$ in a distribution network. Var optimization is calculated with the controllable tap settings $u_t$ fixed at an initial value, or the best value found so far, to output an optimized set of control settings $u_c$. Voltage optimization is calculated with the control settings $u_c$ fixed at the best solution found so far, to output an optimal set of control settings $u_t$. Using an objective function, system performance is evaluated using the optimal set of control settings $u_t$ and $u_c$ and repeating the steps until either the control values $u_t$ and $u_c$ do not change from one iteration to the next, the objective function value does not change or if the new objective function value is greater than the last. The control values $u_t$ and $u_c$ are then output to a distribution control system.

7 Claims, 9 Drawing Sheets

OTHER PUBLICATIONS

S.Civaniar and J.J.Grainger,"Volt/Var Control on Distribution Systems with Lateral Branches Using Shunt Capacitors and Voltage Regulators—Part 2: The Solution Method," IEEE Trans. Power Apparatus and Systems, vol. PAS-104, No. 11, pp. 3284-3290, Nov. 1985.

R.Baldick and F.F. Wu, "Efficient Integer Optimization Algorithms for Optimal Coordination of Capacitors and Regulators,"EEE Trans. Power Systems, vol. 5, No. 3, pp. 805-812, Aug. 1990.

I.Roytelman,B.K.Wee and R.L. Lugtu,"Volt/Var Control Algorithm for Modern Distribution Management System,"IEEE Trans. Power Systems, vol. 10, No. 3, pp. 1454-1460, Aug. 1995.

I.Roytelman,B.K.Wee, R.L.Lugtu, T.M.Kulas and T.Brossart,"Pilot Project to Estimate the Centralized Volt/Var Control Effectiveness,"IEEE Trans. Power Systems, vol. 13, No. 3, pp. 864-869, Aug. 1998.

S.J.Cheng, O.P.Malik and G.S.Hope,"An Expert System for Voltage and Reactive Power Control of a Power System, "IEEE Trans. Power Systems, vol. 3, No. 4, pp. 1449-1455, Nov. 1988.

Yutian Liu et al."Optimal Reactive Power and Voltage control for Radial Distribution System" Power Engineering Society Summer Meeting, 2000. IEEE Jul. 16-20, 2000, Piscataway, NJ, USA, IEEE, Piscataway, NJ, USA LNKD-DOI:10.1109/PESS.2000.867416, vol. 1, Jul. 16, 2000, pp. 85-90, XP010510445 ISBN:978-0/7803-6420-2 the whole document.

Roytelman I, et al.,"Modeling of Local Controllers in Distribution Network Applications" Power Industry Computer Applications, 1999. PICA'99. Proceedings of the 21st. 1999 IEEE International Conference Santa Clara, CA, USA May 16-21, 1999, Piscataway, NJ. USA.IEEE, US LNKD-DOI:10.1109/PICA.1999.779399, May 16, 1999, pp. 161-166, XP010342477 ISBN: 978-0-7803-5478-4 the whole document.

Ramakrishna G et al."Fuzzy Inference System To Assist The Operator In Reactive Power Control In Distribution Systems" IEE Proceedings; Generation, Transmission and Distribution, Institution of Electrical Engineers, GB LNKD-DOI: 10.1049/IP-GTD: 19981694, vol. 145 No. 2, Mar. 13, 1998, pp. 133-138, XP006011134 ISSN: 1350-2360 the whole document.

* cited by examiner

INTEGRATED VOLTAGE AND VAR OPTIMIZATION PROCESS FOR A DISTRIBUTION SYSTEM

This application claims priority to provisional application no. 61/150,185 filed on Feb. 5, 2009 the contents of which are incorporated in their entirety.

BACKGROUND

In electricity distribution systems, loss occurs when current flows through the conductors in the system. The energy loss through a conductor can be calculated according to $I^2R$, where I is the current through a conductor whose resistance is R. The net demand and current flows on a distribution circuit depend on the loading and the voltage profile on the feeders. Net demand is the net energy delivered from the substations into the distribution circuits and is the summation of the total energy loss on all the conductors in the circuits and the total energy delivered at all load connection points. Reactive compensation can reduce unnecessary current flows attributable to reactive power flows and in turn reduce losses. Voltage regulation affects the effective loading of feeders, as well as the energy losses.

Voltage and Var optimization (VVO) systems are employed in electricity distribution systems to optimize the distribution of voltages and currents on distribution systems. VVO systems endeavor to maximize efficiency of energy delivery by controlling voltage regulators (Voltage) and reactive power resources (Var) by employing online system models and demand forecasts.

With reference to FIG. 1, an electricity distribution network is shown. As can be seen, a substation provides power to a plurality of loads via a distribution system. Distributed at various points in the distribution network are capacitor banks C that may be fixed or switched. The connectivity of the network and the status of the various pieces of equipment, such as transformers, loads, capacitors, voltage regulators, are monitored. Monitored data may include voltage, current and/or power at or through various points or conductors. This information is transmitted to a distribution management system (DMS) or a substation automation system. Upon receiving the updated status information, the system model within the DMS is updated. A load forecast is performed based on the SCADA data, customer billing data, and/or data collected from advanced metering infrastructure (AMI).

The VVO, utilizing the load forecasts, the system model, and the available control information, then determines the best tap settings for the voltage regulators and on load tap change (OLTC) transformers located either at the substation or on the feeders, and the Var resources such as switched shunt capacitors or reactors. Control commands are then transmitted back to the various elements in the distribution grid where the control actions are carried out, bring the system to a more efficient operating state. Voltage regulation optimization (VRO) and var optimization (VARO) are fundamental subsystems of a VVO system. The control variables for the VARO are the switchable or dispatchable reactive power sources. The control variables for the VRO are the controllable taps of voltage regulating transformers.

The concept of optimizing energy delivery efficiency on electric distribution systems dates back several decades and many in the industry and the research communities have attempted to develop effective solution methodologies and processes. Most solution approaches proposed to date are applicable to small, very simplified academic models, and are not suitable for large scale, meshed, multi-source, multi-phase unbalanced distribution systems. The limitations in the methods are due to (1) the model being too simplified (i.e. radial, balanced network, balanced load, single source) to represent a real system, (2) the computation efficiency being so low that the solution can not be scaled for either online or offline applications for large system, or (3) the optimization power is very limited.

Thus, there is a need in the art for an optimization solution that is applicable to large scale, meshed, multi-source, multi-phase unbalanced distribution systems, and that is efficient for online applications.

SUMMARY OF THE INVENTION

According to one aspect of the present invention, a method is provided for determining the optimal settings for the controllable taps $u_t$ of voltage regulating transformers and the capacitor bank switches $u_c$ in a distribution network. A network model is received and a set of state variables x and control variables u are determined. Using an objective function, an overall objective value of the network under initial control variables u is calculated. A var *optimization* calculation is performed with the controllable tap settings $u_t$ fixed at an initial value, or the best value found so far, to output an optimized set of control settings $u_c$. A voltage optimization calculation is performed with the control settings $u_c$ fixed at the best solution found so far, to output an optimal set of control settings $u_t$. Using the objective function, the system performance is evaluated using the optimal set of control settings $u_t$ and $u_c$. The steps of performing var optimization and performing voltage optimization are repeated until either the control values $u_t$ and $u_c$ do not change from one iteration to the next, the objective function value does not change or if the new objective function value is greater than the last. The control values $u_t$ and $u_c$ are then output to a distribution control system.

DETAILED DESCRIPTION OF THE INVENTION

Figure 1:
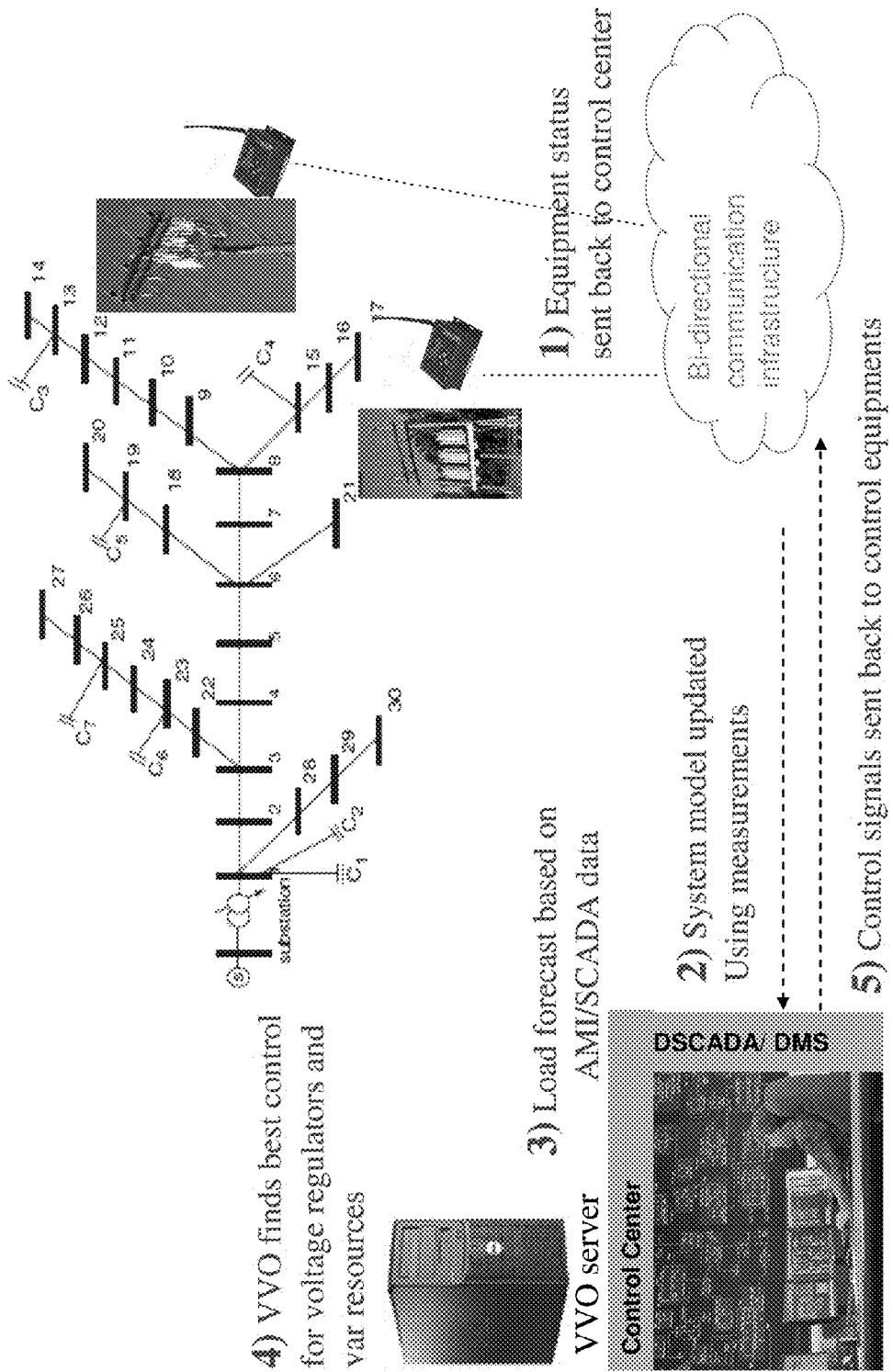
FIG. 1 is a view of a voltage and var optimization system operating in conjunction with a distribution network.

The present invention relates to an integrated voltage and var optimization (IVVO) process. The purpose of IVVO is to find the optimal integer solution for the controllable taps of the voltage regulating transformers and the switchable capacitor/reactor banks to minimize the energy loss or the total demand on a distribution circuit.

In the description of the solution process, reference will be made to two categories of variables: the state variables and the control variables. The state variables are the phase specific voltages at every node of the system in either polar or rectangular coordinates. The state variable vector is designated by x. A node is a physical or conceptual connection point between different network elements, such as, for example, the connection point between a transformer and a section of overhead line or underground cable, or a point on a section of over-head line where a distribution service transformer is connected. Several phase specific voltage variables can be defined for each node depending on the actual phases that are present. Each phase specific voltage variable, such as line to neutral voltage or line to line voltage, is represented by a complex number that is characterized by a magnitude and a phase angle. In an unbalanced system, due to either construction asymmetry or loading asymmetry, the phase specific voltages at a node are not necessarily symmetric and thus, may not have the same magnitude and may not have symmetric phase angle shift.

The control variables for IVVO are the ganged (all three phases operate in unison) or un-ganged (each phase has its own control) control of the tap changer controls of voltage regulating transformers and the switchable reactive power controls. The absolute majority of these controls are integer in nature due to the fact that the switchable resources can not be switched fractionally and that the tap of the transformers can only be changed at integer tap positions. The control variable vector is designated by $u^T=[u_c^T \, u_t^T]$, where $u_c$ is the control variable for the switchable reactive power controls (capacitors) and $u_t$ is the control variable for the voltage regulating transformers (tap changers).

The purpose of the IVVO is to determine the appropriate control variable values that minimize an objective function that can be either energy loss or total demand on the distribution circuit, or a combination of the two. Once the optimal values for these control variable are determined by IVVC, they may then be communicated to a suitable subsystem in a distribution management system. These control values are then transmitted to the corresponding equipment in the distribution network where the appropriate control actions will be carried out so that the statuses of the controllable equipment will correspond to the optimal values determined by IVVC.

The energy loss and/or total demand is a function of the state variables, which in turn depend on the control variables through their effect on the power flow equations. Given the network model, the load types and distributions on the network, and the settings of the controllable elements, a load flow problem can be solved, which gives us the state variables, i.e., the complex voltages at all network nodes. From these nodal voltages and the network components connected between the nodes, the fundament equations (that define the relationship between the nodal voltages and nodal currents for the network components) are used to determine the current flows through the network components, from which the loss on each component may be calculated. The amount of power each load is actually drawing from the system can be determined from the nodal voltages and the load connection information, since the actual load depends to a varying degree on the magnitude of the nodal voltage.

If the settings of the controllable components are changed, for example, by changing the tap of a tap changer from position 0 to 3, for the same network, and the same load distribution, a new power flow problem must to be solved and the solution produces somewhat different values for the state variables. In any case, once the values of the state variables are known, the loss or the net demand can be calculated.

The objective function is designated by $f(x, u_c, u_t)$. There may be several variations of the expression of $f(x, u_c, u_t)$ depending upon whether demand or loss is being minimized. In the exemplary embodiment below, minimizing net demand (net power extracted from the substation, which is equal to the total loss plus the net load delivered at all load nodes.) is illustrated. In this case the objective function may be written as:

$$f(x, u_c, u_t) = \text{total\_demand} + \text{violation\_penalty}$$

$$\text{total\_demand} = \sum_{k \in K} \sum_{j \in B(k)} (v_k^d i_{k,j}^d + v_k^q i_{k,j}^q)$$

The violation penalty terms are introduced (details provided later) to penalize solutions with any current and voltage violations. With sufficiently large penalty factor, infeasible solutions are eliminated whenever possible.

In the above definition, K is the set of source nodes and B(k) is the set of branches emanating from source node k. $v_k^d, v_k^q$ are the real and imaginary parts of the phase specific voltage at source node k. $i_{k,j}^d, i_{k,j}^q$ are the real and imaginary parts of the current on the branch from source node k to node j. Each of the quantities involved is a function of the state variables and, implicitly, the control variables.

Power flow balance constraints must be satisfied for every phase at every node. These are non-linear equality constraints. The power flow equations are designated by $g(x, u_c, u_t)=0$ in vector form. Voltage magnitude constraints also exist at every load connection or other points of concern. For Wye connected loads, the phase to neutral voltage magnitude is used. For delta connected loads, the phase to phase voltage magnitude is used. Each voltage magnitude must operate within a user specified upper and lower limit, usually +/−5% of nominal voltage value. The voltage constraints are designated by and $v^{lb} \leq v(x, u_c, u_t) \leq v^{ub}$ in vector form, where $v^{lb}$ and $v^{ub}$ are the lower bound and upper bound vector for the voltage constraints.

Current constraints exist for current flow through cables, overhead lines, and transformers. The current flowing through a conductor must be within a user specified maximum. The current constraints are designated by $i(x, u_c, u_t) \leq i^{ub}$ in vector form, where $i^{ub}$ is the current upper bound vector.

Constraints also exist for the control variables of every independent control, these constraints are designated by $u^{lb} \leq u \leq u^{ub}$ in vector form, where $u^{lb}$ and $u^{ub}$ are the lower bound and upper bound of the control variables. For example, a tap changer with +/−10% regulation range may have tap settings ranging from −16 to +16, which define the lower and upper bound for that tap changer; The control variable of switchable capacitor banks at a node are modeled either as a binary variable or general integer variable, depending on how many banks there are and whether they are independently controlled.

Figure 2:
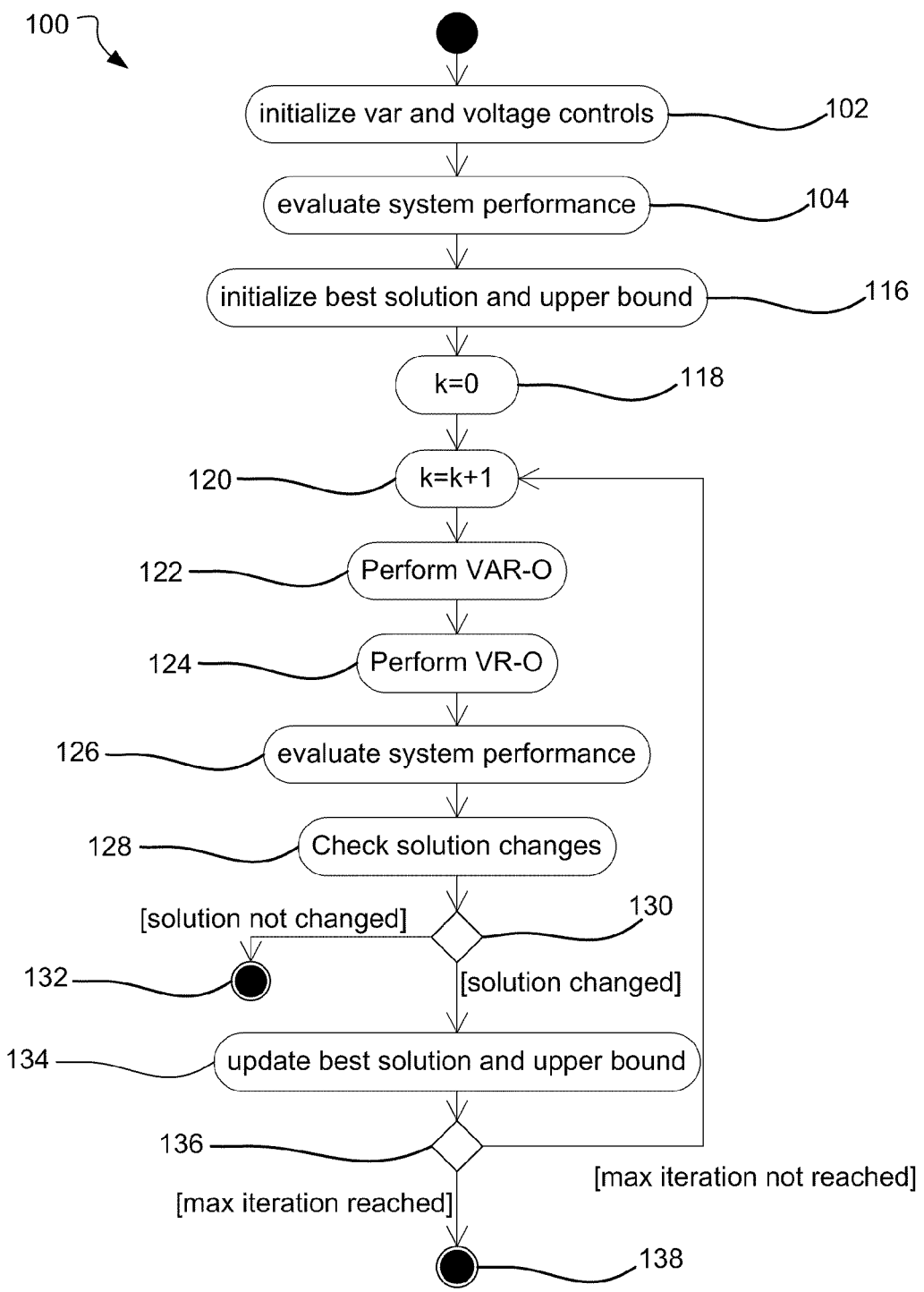
FIG. 2 is a process view of the integrated voltage and var optimization system.

With reference now to FIG. 2, the overall system process is shown and generally indicated by the numeral 100. In a first step 102, the control variables are initialized to some starting values $u^T(0)=[u_c^T(0) \, u_t^T(0)]$, which can be a default value, the existing settings in the system model, or from a previous solution of the same system.

In a second step 104, the system performance is evaluated with the primary objective of evaluating the objective function value at the current control settings. The method of evaluating performance is shown in greater detail in FIG. 3. In a first step 106, the unbalanced load flow is solved with voltage dependent load models and with the control vector fixed at the given value. The unbalanced load flow is solved using a phase based load flow formulation that is capable of modeling off nominal tap positions for transformers and voltage dependent loads. Voltage dependent load can be any combination of constant power, constant impedance, and constant current load. Each load point in the model is characterized by the load type, which does not change frequently, and the load forecast, which is the anticipated power drawn by that load at nominal voltage. When the power flow is solved, the actual load drawn by a load could be different from the load forecast value due to the deviation of actual voltage from the nominal value. The primary output from the load flow solution is the state variable vector that specifies the complex voltage at every node of the network. From the state variables and the component model (lines, transformers, loads), the complex current through every conductor in the system can be calculated.

At 108, after the load flow is solved, energy demand and loss are calculated using the example demand function shown above. At 110 the current constraint violation on any conductors on which current limit violations are of concern are calculated according to $\Delta I_j = \max(I_j - I_j^{max}, 0)$. At 112 voltage violations are calculated for all nodes of interest, for example, all load nodes or all the nodes in the system, according to $\Delta V = \max(V_i - V_i^{max}, V_i^{min} - V_i, 0)$. Finally, at 114, an objective function value is calculated which is a weighted sum of the energy demand, energy loss, and the voltage and current violations. The objective function is shown below:

$$obj(x, u_c, u_t) = w_d \cdot \text{demand}(x, u_c, u_t) + w_l \cdot \text{loss}(x, u_c, u_t) + \sum_i w_i^V \Delta V_i + \sum_j w_j^I \Delta I_j$$

Where,
$w_d$ is the weighting factor for demand
$w_l$ is the weighting factor for loss
$w_i^V$ is the weight factor for i-th voltage violation
$\Delta V_i$ is the i-th voltage violation, $\Delta V_i = \max(V_i - V_i^{max}, V_i^{min} - V_i, 0)$
$w_j^I$ is the weight factor for j-th current violation
$\Delta I_j$ is the j-th current violation violation, $\Delta I_j = \max(I_j - I_j^{max}, 0)$ After the objective value for the initial control settings is evaluated, the best solution for IVVC so far is set to the initial solution. The best solution will be updated when a better solution is found during the iterative process. With reference again to FIG. 2, the best solution and objective function are initialized to the initial control and the corresponding objective value.

$$u_{best} = u(0)$$

$$obj_{best} = obj(u(0))$$

At 118 an iteration counter, which tracks the iteration numbers, is set to zero. At 120, the iteration counter is incremented. At 122, with $u_t = u_t(k-1)$ (i.e., treat the tap changer as non-controllable at the current step), var optimization is performed to get $u_c(k)$.

Figure 4:
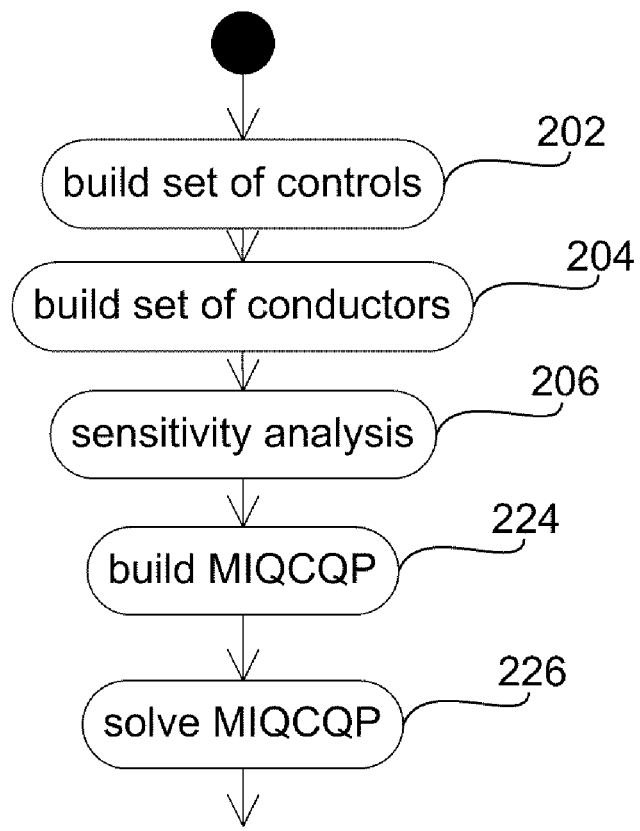
FIG. 4 is a process view showing the var regulation optimization process overview.
Figure 5:
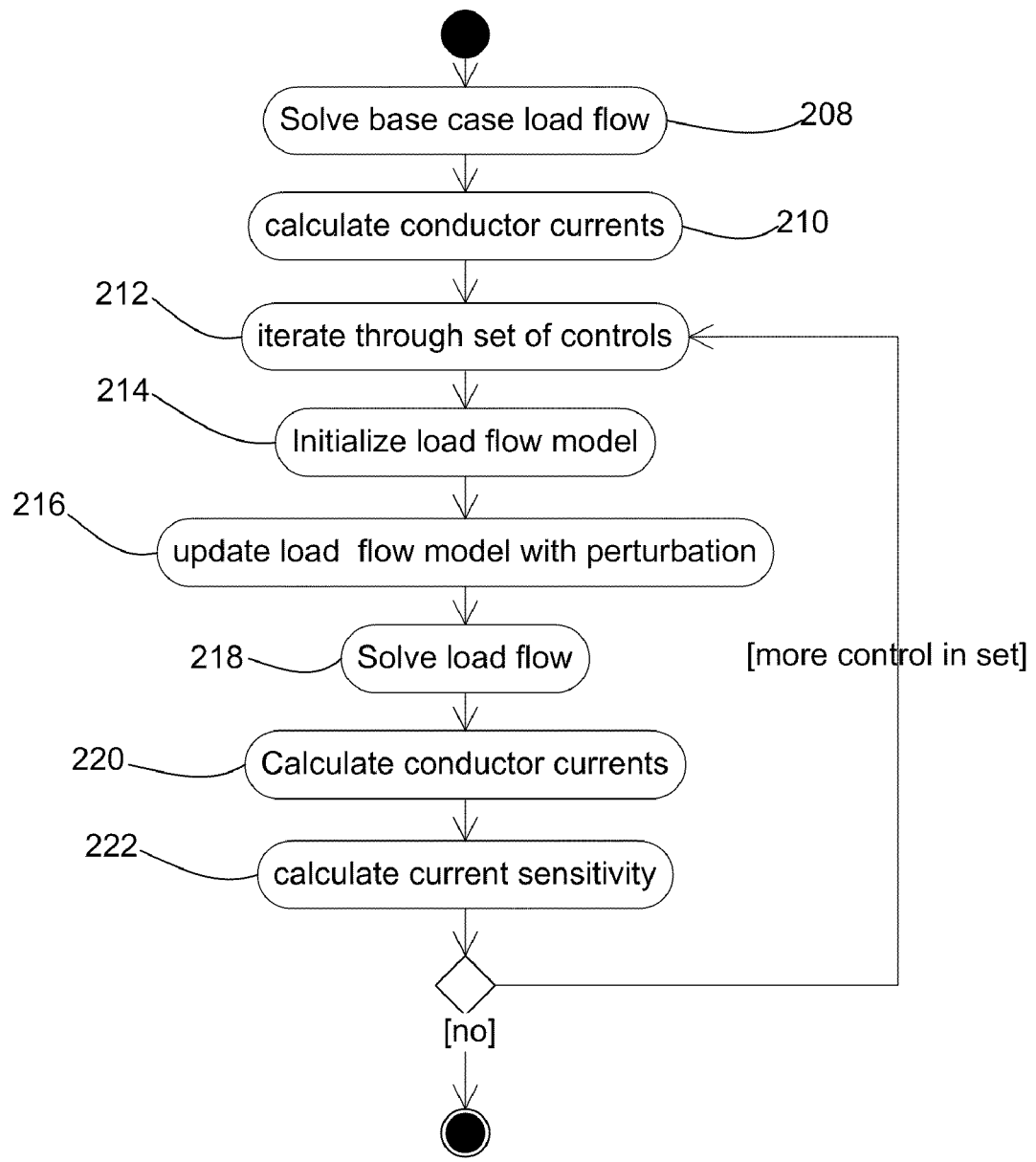
FIG. 5 is a process view showing a detailed view of the sensitivity analysis steps of the VARO process.

According to one embodiment, var optimization is performed according to the methods disclosed in FIGS. 4 and 5. With reference now to FIG. 4, an overview of the var optimization is shown. At 202 the system model (unbalanced multi-phase representation of load flow model) is received from the distribution management system or substation automation system and is scanned/examined to identify all independent var controls (either ganged or un-ganged), information regarding control range, bank size, connection information are collected. The scan produces a set $S^c$ of all independent var controls. For example, if the system under optimization has two capacitor banks, one has three phases (A, B, and C) with ganged control and another with two phases (A, C) with un-ganged controls, the control set will have three control variables, where one control variable is the three phase ganged control, another control variable for phase A of the second capacitor bank, and one more control variable for phase C of the second capacitor bank.

At 204, the system model (unbalanced multi-phase representation of load flow model) is also scanned to identify all conductors through which current flows and resistive loss may occur. The conductors include conductors in each phase of cables, overhead lines, transformers, neutral wires, grounding resistance, and earth returns. Information regarding conductor resistance $r_i$ and current limit $I_i^{max}$ are collected. The set of conductors is denoted by $S^b$. For example, if the system under optimization has three line sections each having all three phases present, the conductor set will have total of nine conductors.

At 206 a current sensitivity analysis is performed. With reference to FIG. 5, a more detailed view of the current sensitivity analysis is shown. At 208 the unbalanced load flow is solved for the base case, where the capacitor banks are left at their initial settings u(0) (on or off). At 210 the initial current values $I_i^d(0), I_i^q(0)$ for each conductor in $S^b$ are calculated, which usually are not calculated by a load flow program by default. At 212, an iteration is done over each element of the control set.

For each control in $S^c$, at 214 the load flow model is initialized (restored) to the base case. At 216, the load flow model is updated with a unit bank perturbation (turning one bank on or off). If a capacitor bank's initial status is off, the perturbation is to turn it on, otherwise, the perturbation is to turn it off. At 218 the load flow is resolved for the perturbed case. At 220 the conductor currents $I_i^d, I_i^q$ are calculated for each element in the conductor set. At 222 changes in current for each element in the conductor set between the base case and the perturbation case are calculated according to $$\Delta I_i^d = I_i^d - I_i^d(0),$$

$$\Delta I_i^q = I_i^q - I_i^q(0),$$

which are the sensitivity of conductor currents in response to the var control when normalized by the perturbation size. Fractional perturbation (turning only a portion of a bank on or off, in simulation) can also be used without significant effect on the results. The sensitivity values of the conductor currents to unit bank switching of var are denoted by $S^d, S^q$, which will be used in the main process for building the optimization problem.

With reference again to FIG. 4, from the output of current sensitivity analysis and the initial load flow solution, a mixed integer quadratically constrained quadratic optimization problem (MIQCQP) can be constructed at 224. The control variables are restricted to integer solutions and the MIQCQP is illustrated below.

$$\min \sum_{i \in S^b} r_i ((I_i^d)^2 + (I_i^q)^2)$$

-continued $$\text{s.t. } (I_i^d)^2 + (I_i^q)^2 \leq (I_i^{max})^2, \quad \forall\, i \in S^b$$

$$I^d - S_i^d(u - u(0)) = I^d(0), \quad \forall\, i \in S^b$$

$$I^q - S_i^q(u - u(0)) = I^q(0), \quad \forall\, i \in S^b$$

$$u^{lb} \leq u \leq u^{ub}$$

$$u \in \mathbb{R}^n$$

Slack variables can be added to the current limit constraints to reduce violations and assure technical feasibility.

At 226 the MIQCQP is solved by a general purpose MIP solver to get the optimal var control in integer solution. The output will be the optimal status for each of independently controlled capacitor bank.

Figure 6:
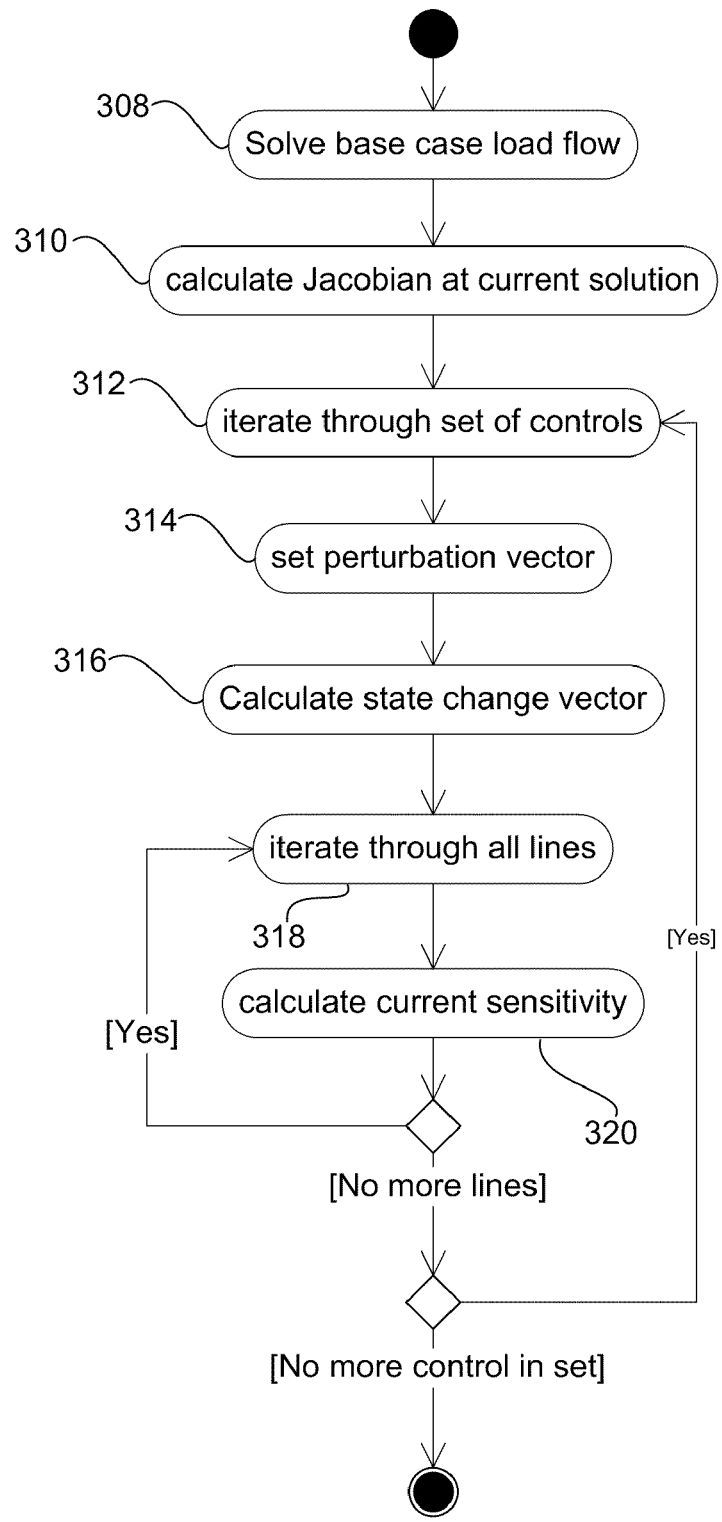
FIG. 6 is a process view showing an alternate sensitivity analysis approach.

According to another embodiment of var optimization method, the sensitivity analysis 206 may be calculated in the alternative according to the method shown in FIG. 6. At 308, the unbalanced load flow is solved for the base case (i.e. the system condition before VARO, when all the control settings are at their initial values) at the initial control value u(0). The state variable for the base case solution is denoted by x(0). Next, at 310, the Jacobian matrix is calculated at the current solution. The Jacobian matrix of the load flow solution is obtained according to the following:

$$J = \frac{\partial g}{\partial x},$$

where g(x,u(0))=0 is the power flow equation in vector form.

At 312, for each of the controls in $S^c$, the following calculation is performed. At 314 the perturbation vector $\Delta S$ is calculated, where $\Delta S$ is zero except the one non-zero element with value $\Delta Q$ in the row corresponding to the reactive power equation where the reactive resource is located. $\Delta Q$ can be the reactive power of one bank or a fraction of switchable shunt capacitor/reactors. At 316 the state change vector $\Delta x$ is solved according to the equation: $\Delta S = J\,\Delta x$. $\Delta x$ may optionally be converted to rectangular coordinates.

At 318, for each conductor in $S^b$, the complex current sensitivity is calculated at 320. The current sensitivity for each conductor is calculated where $\Delta I^d$ and $\Delta I^q$ are calculated from:

$$\Delta I_{k,m} = \Delta I_{k,m}^d + j\Delta I_{k,m}^q$$
$$= Y_{k,m}((\Delta V_k^d - \Delta V_m^d) + j(\Delta V_k^q - \Delta V_m^q)),$$
$$= (G_{k,m} + jB_{k,m})((\Delta V_k^d - \Delta V_m^d) + j(\Delta V_k^q - \Delta V_m^q))$$

Where $\Delta I_{k,m}^d$ and $\Delta I_{k,m}^q$ are the change in the real and imaginary part of current between k-th node and m-th node, $Y_{k,m}$ ($G_{k,m}$ and $B_{k,m}$ are the real and imaginary part of $Y_{k,m}$) is the complex admittance matrix for the multi-phase conductor connecting the k-th node and m-th node. Equation for calculating the current through transformers are similar. Finally, sensitivity is calculated according to:

$$\frac{\Delta I_{k,m}^d}{\Delta Q} \text{ and } \frac{\Delta I_{k,m}^q}{\Delta Q}.$$

As shown in FIG. 6, this calculation is performed iteratively for each conductor in the conductor set with respect to each control in the control set. Fractional perturbation (turning only a portion of a bank on or off) can also be used without significant effect on the results. The sensitivity values of the conductor currents to unit bank switching of var are denoted by $S^d, S^q$, which will be used in the main process for building the optimization problem.

Figure 3:
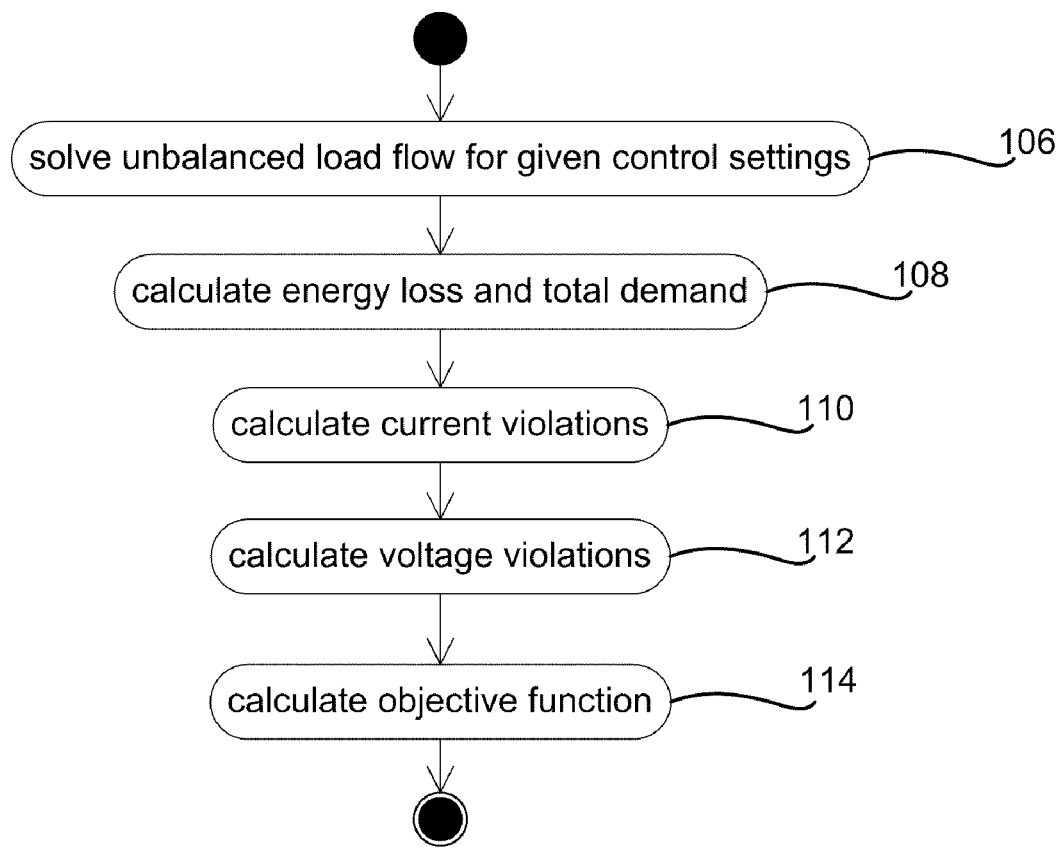
FIG. 3 is a process view of the step of evaluating system performance.
Figure 7:
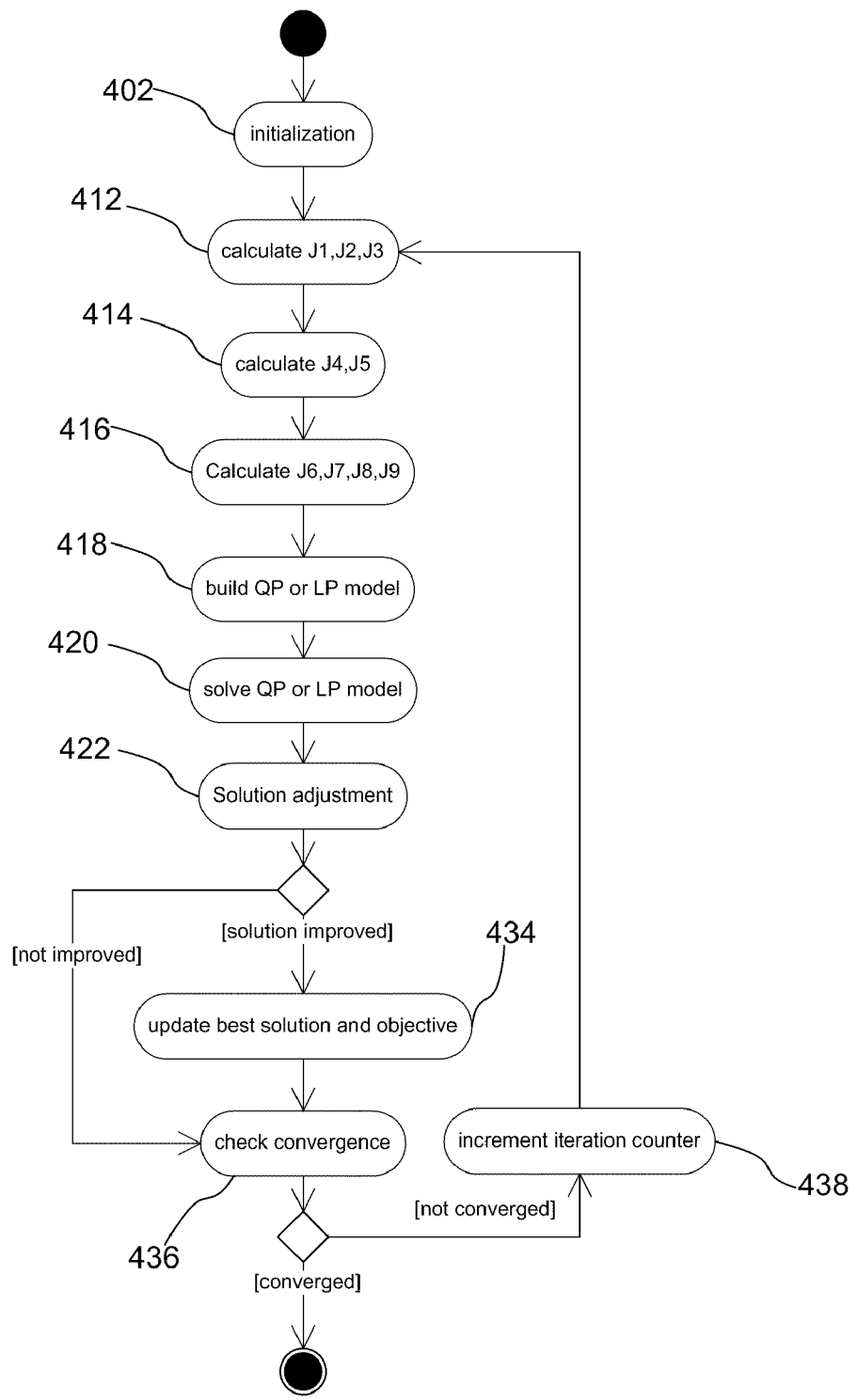
FIG. 7 is a process view showing the voltage regulation optimization (VRO) process overview.
Figure 8:
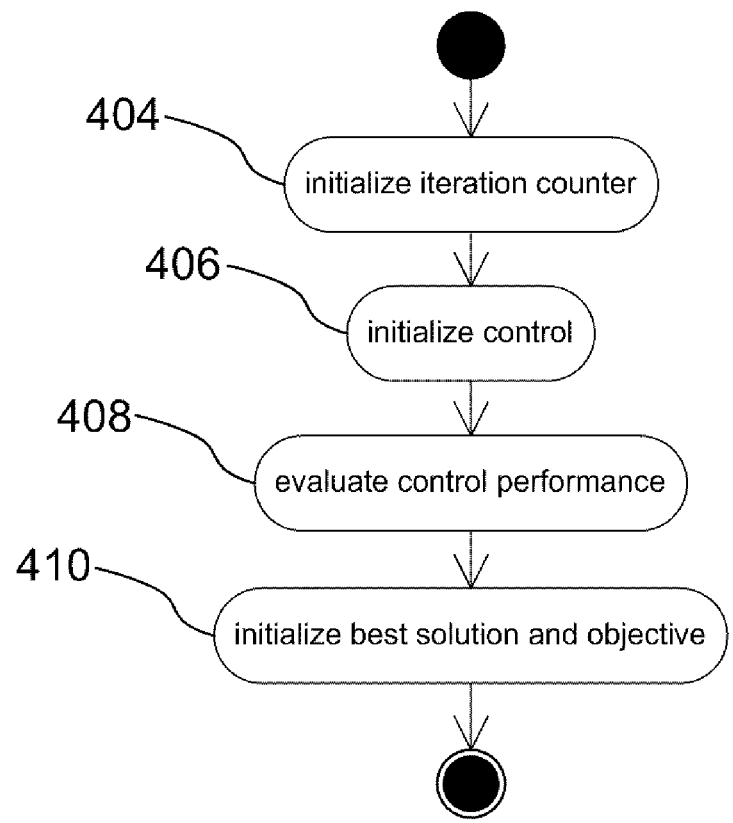
FIG. 8 is a process view showing the initialization steps of the voltage regulation optimization process.

At 124, with $u_c = u_c(k)$ (i.e., the var control setting are updated to the results from 122), voltage regulation optimization is performed to get $u_r(k)$. According to one embodiment, voltage regulation optimization is performed according to the methods disclosed in FIGS. 7 and 8. With reference now to FIG. 7, an overview of voltage regulation method is shown. As can be seen, at a first step 402, the process is initialized. FIG. 8 shows a more detailed description of the initialization process wherein, at 404 an optimization iteration counter is initialized. This counter is later incremented during the iteration process to keep track of the number of iterations performed and used for the purpose of algorithm termination. At 406 the controls are initialized. The control variables are initialized to some starting values, which can be a default value, the current settings in the system model, or from previous solution of the same system. At 408 the control performance at the initial control settings is evaluated. The objective function is calculated in the same manner as shown in FIG. 3. At 410 the best solution and objective for VRO are initialized to the initial control and the corresponding performance evaluation.

With reference again to FIG. 7, after initialization, matrix $J_1, J_2, J_3$ are calculated at 412. A Jacobian matrix $J_1$ is calculated according to following definition at the current u and x $$J_1 = \frac{\partial g}{\partial x},$$

which is the Jacobian of power flow equations with respect to the system state variables. This matrix can be provided by the unbalanced load flow solver if such interface is provided.

A Jacobian matrix $J_2$ is calculated according to following definition at the current u and x $$J_2 = \frac{\partial g}{\partial u},$$

which is the Jacobian of power flow equations with respect to the control variables. This matrix can be provided by the unbalanced load flow solver if such interface is provided.

A Jacobian matrix $J_3$ is calculated according to following definition at the current u and x $$J_3 = -\left(\frac{\partial g}{\partial x}\right)^{-1}\frac{\partial g}{\partial u},$$

which is the Jacobian of state variables with respect to the control variables under the constraints of power flow equations.

At 414, are $J_4, J_5$ are calculated. Jacobian matrix $J_4$ is calculated for the voltage magnitude constraints according to following definition at the current u and x $$J_4 = \frac{\partial v}{\partial u} + \frac{\partial v}{\partial x} \cdot J_3$$

Jacobian matrix $J_5$ is calculated for the current magnitude constraints according to following definition at the current u and x $$J_5 = \frac{\partial i}{\partial u} + \frac{\partial i}{\partial x} \cdot J_3$$

At 116, $J_6, J_7, J_8, J_9$ are calculated according to the following equations:

$$J_6 = \frac{\partial v_K^d}{\partial u} + \frac{\partial v_K^d}{\partial x} \cdot J_3$$
$$J_7 = \frac{\partial v_K^q}{\partial u} + \frac{\partial v_K^q}{\partial x} \cdot J_3$$
$$J_8 = \frac{\partial i_K^d}{\partial u} + \frac{\partial i_K^d}{\partial x} \cdot J_3$$
$$J_9 = \frac{\partial i_K^q}{\partial u} + \frac{\partial i_K^q}{\partial x} \cdot J_3$$

Given these Jacobian matrix calculated above, any nonlinear quantity in the original problem can be approximated by a first order expansion around the current control setting u(0). For example:
$i(x,u)=i(x(u(0)),u(0))+J_5(u-u(0)) \leq i^{ub}$, where u(0) is the current operating point. When the objective function is expressed in different forms, such as loss plus load, the Jacobeans calculated here are slightly different, but the concept and process remain identical.

At 418 a quadratic program (QP) or linear program (LP) model is constructed using the first order approximation of the current and voltage quantifies in the objective function and the constraints. When the nonlinear quantities in the original optimization problem are replaced by their first order expansions by using the Jacobeans $J_4$ through $J_9$, a quadratic programming (QP) problem is generated. Depending on the boundary conditions, the QP may degenerate into an LP (linear program) if the source voltage magnitudes do not change with control variable u, i.e, when the source is an ideal source (also known as an infinite bus) whose voltages do not respond to changes in the control setting, in this case, the objective function will be linear in the current variables. A step size is introduced to the QP to limit the maximum control changes, i.e., u-u(0), allowed in a single iteration to prevent overshoot. The same penalty weighting as in the solution performance evaluation is used in the QP to reduce voltage or current violations.

Figure 9:
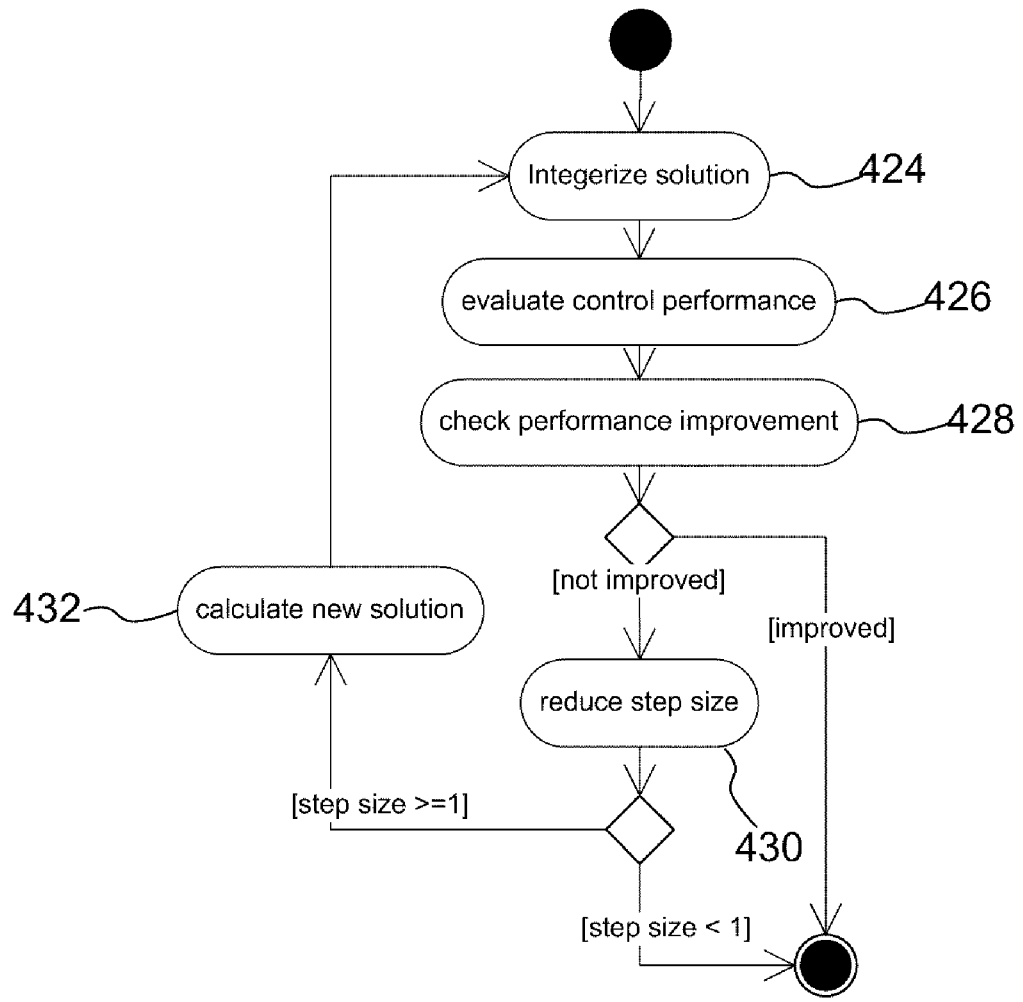
FIG. 9 is a process view showing the solution adjustment steps of the voltage regulation optimization process.

At 420 the QP or LP problem is solved by a general purpose QP solver to get the proposed control changes. At 422 the proposed solution update is adjusted. With reference to FIG. 9, a more detailed view of the solution adjustment is shown. At 424 the solution for the QP or LP is converted to nearest integer. It should be appreciated, however, that variations such as discretization by truncation can de used without changing the overall solution process and architecture. A trial control setting vector is thus calculated by applying the update to the initial value for the current iteration. The trial solution's performance is evaluated at 426. Performance is evaluated as discussed above and with reference again to FIG. 3. The improvement, as defined as the difference between the performance at the trial solution and the best solution found by VRO so far, is checked at 428. If the performance improves i.e., the objective function value is lower at the trial solution than at the best solution found so far, exit. If performance does not improve, at 430 the step size is reduced by a reduction factor $\beta$, $0<\beta<1$. If the new step size is less than 1, exit. Otherwise, at 432, a new control correction vector is calculated using the new step size along the same feasible direction as proposed by the QP solution, and the solution adjustment is repeated.

Referring again to FIG. 7, if the solution improved, at 434 the best solution and the corresponding objective value are updated with the solution found at this iteration. If the solution is not improved, step 434 is skipped. At 436 convergence is checked. Convergence criteria can be a combination of absolute improvement, percentage of improvement in the objective value, step size reduced to less than 1, or an iteration limit has been reached. If converged, the process terminates, otherwise, the iteration counter is incremented at 438 and the process is repeated. The output of the solution process will be an optimal control vector for tap changer settings.

At 126, with $u_c=u(k)$ and $u_r=u_r(k)$, the system performance is evaluated at the new var *and* voltage control settings to get $obj(k)=obj(u_c(k),u_r(k))$. At 128 solution changes are checked against the best solution so far to determine if a better solution has been found. The process is considered converged if any one of the following conditions is satisfied:

$$|\Delta u| = |u(k)-u(k-1)|=0$$

$$|obj| = |obj(k)-obj(k-1)| \leq \epsilon$$

$$obj(k) > obj(k-1)$$

According to another embodiment, other conditions such as percentage change in the objective function may also be used.

At 130, if the solution has converged, the process terminates and the control values are output at 132. In one embodiment, the control values are output to a suitable subsystem of a distribution management system or a substation automation system which transmits control signals to the controlled equipment in the distribution network. If the objective improved, the best solution is updated at 134 according to $$u_{best} = u(k)$$
$$obj_{best} = obj(u(k)).$$

At 136 an iteration check is performed wherein, if the max iteration count is not reached, the process returns to step 120 and starts the next iteration. However, if $k>k^{max}$ the process terminates and the control values are output at 138. In one embodiment, the control values are output to a distribution management system which transmits control signals to the controlled equipment in the distribution network.

In summary, the var optimization (VARO) is performed with the tap changer control $u_t$ fixed at values from the previous iteration. With $u_t$ fixed, the problem is reduced to a VARO problem. The output of the VARO is an updated set of control settings $u_c$ for the capacitor banks. Next, at 124 the updated settings of the capacitor banks $u_c$ are held constant, the voltage regulation optimization (VRO) problem is solved. The output of the VRO is an updated set of control settings $u_t$ for the voltage regulating transformers. This completed set of control settings are then used in a new system performance evaluation which outputs a value which the system seeks to minimize. If the control values do not change from one iteration to the next, if the objective function does not change or if the new objective function result is greater than the last, the process is terminated and the best solution found up to that point is output to the DMS.

As can be appreciated by one of ordinary skill in the art, the present invention may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: an electrical connection having one or more wires, a portable computer diskette, a flash drive, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Computer program code for carrying out operations of the present invention may be written in an object oriented programming language such as Java, Smalltalk, C++ or the like, or may also be written in conventional procedural programming languages, such as the "C" programming language. The program code may execute entirely in a DMS system, or a separate computer as a stand-alone software package.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for determining optimal settings for controllable taps $u_t$ of voltage regulating transformers and capacitor bank witches $u_c$ in a distribution network, comprising:
   receiving a network model and determining a set of state variables x and control variables u;
   using an objective function, calculating an overall objective value of the network under initial control variables u;
   performing a var optimization calculation with the controllable tap settings $u_t$ of the controllable taps fixed at an initial value, or the best value found so far, to output an optimized set of control settings $u_c$ of the capacitor bank switches;
   performing a voltage optimization calculation with the control settings $u_c$ fixed at the best solution found so far, to output an optimal set of control settings $u_t$;
   using said objective function, evaluating the system performance using said optimal set of control settings $u_t$ and $u_c$ and repeating said steps of performing var optimization and performing voltage optimization until either the control values $u_t$ and $u_c$ do not change from one iteration to the next, the objective function value does not change or if the new objective function value is greater than the last; and
   outputting said control values $u_t$ and $u_c$ to a distribution control system.

2. The method of claim 1 wherein said step of performing voltage optimization further comprises:
   constructing a sequence of quadratic programs (QP) based on first order approximation to generate trial solutions and performing full non-linear unbalanced load flow on the trial solution to determine the actual improvement in said objective function before accepting the trial solution;
   discretizing the non-integer QP solution and performing systematic adjustment to identify the trial solution that produces performance improvement in non-linear unbalanced load flow simulation; and
   initially generating a best control setting and associated objective value, and iteratively updating the best solution and objective value.

3. The method according to claim 2 wherein the method further includes calculating jacobian matrix $J_1$-$J_9$ according to the equations, $$J_1 = \frac{\partial g}{\partial x}; \quad J_2 = \frac{\partial g}{\partial u}; \quad J_3 = -\left(\frac{\partial g}{\partial x}\right)^{-1}\frac{\partial g}{\partial u}; \quad J_4 = \frac{\partial v}{\partial u} + \frac{\partial v}{\partial x} \cdot J_3;$$

$$J_5 = \frac{\partial i}{\partial u} + \frac{\partial i}{\partial x} \cdot J_3; \quad J_6 = \frac{\partial v_K^d}{\partial u} + \frac{\partial v_K^d}{\partial x} \cdot J_3; \quad J_7 = \frac{\partial v_K^q}{\partial u} + \frac{\partial v_K^q}{\partial x} \cdot J_3;$$

$$J_8 = \frac{\partial i_K^d}{\partial u} + \frac{\partial i_K^d}{\partial x} \cdot J_3; \quad J_9 = \frac{\partial i_K^q}{\partial u} + \frac{\partial i_K^q}{\partial x} \cdot J_3.$$

4. The method according to claim 2 wherein the method further includes building said quadratic problem using said $J_1$-$J_9$.

5. The method according to claim 2 wherein the method further includes checking for convergence, wherein if convergence is determined, the best control set is output and if not converged, the program returns to said step of calculating jacobian matrix $J_1$-$J_9$ and constructing a new QP and proposing trail correction to the control variables by solving the QP.

6. A method according to claim 1 wherein said step of performing var optimization comprises:
   receiving a network model and building a set of controls $S^c$ and a set of conductors $S^b$ in the network model;
   solving a base case unbalanced load flow for a base network;
   determining initial current values $I_i^d(0), I_i^q(0)$ for each conductor $S^b$ in the base case;
   initializing the load flow model to an initial case and, for each control in $S^c$;
   perturbing the capacitor status for each control in $S^c$ and determining a new load flow for the model with the perturbed capacitor status;
   calculating new currents $I_i^d, I_i^q$ for each conductor in $S^b$ using the new load flow and determine current sensitivity vectors $S^d, S^q$ according to $\Delta I_i^d = I_i^d - I_i^d(0)$, $\Delta I_i^q = I_i^q - I_i^q(0)$;
   constructing, using the initial load flow solution and the current sensitivity vectors $S^d$, $S^q$, a MIQCQP;
   solving said MIQCQP to output optimal control settings for $S^c$; and
   outputting said optimal control settings.

7. The method according to claim 6 wherein said MIQCQP is calculated according to:

$$\min \sum_{i \in S^b} r_i \left((I_i^d)^2 + (I_i^q)^2\right)$$

-continued s.t. $(I_i^d)^2 + (I_i^q)^2 \leq (I_i^{max})^2, \quad \forall\ i \in S^b$ $I^d - S_i^d(u - u(0)) = I^d(0), \quad \forall\ i \in S^b$ $I^q - S_i^q(u - u(0)) = I^q(0), \quad \forall\ i \in S^b$ -continued $u^{lb} \leq u \leq u^{ub}$ $u \in {}^n.$

* * * * *